(12) United States Patent
Kuduvalli

(10) Patent No.: US 7,315,636 B2
(45) Date of Patent: Jan. 1, 2008

(54) GENERATION OF RECONSTRUCTED IMAGES

(75) Inventor: Gopinath Kuduvalli, San Jose, CA (US)

(73) Assignee: Accuray, Inc., Sunnyvale, CA (US)

( * ) Notice: Subject to any disclaimer, the term of this patent is extended or adjusted under 35 U.S.C. 154(b) by 815 days.

(21) Appl. No.: 10/813,807

(22) Filed: Mar. 31, 2004

(65) Prior Publication Data
US 2005/0226482 A1  Oct. 13, 2005

Related U.S. Application Data

(60) Provisional application No. 60/504,106, filed on Sep. 18, 2003.

(51) Int. Cl.
*G06K 9/00* (2006.01)
(52) U.S. Cl. ............... 382/128; 382/280; 128/922; 378/4; 708/403; 702/77
(58) Field of Classification Search ............... 382/100, 382/128, 280; 128/922; 378/4; 708/403; 702/77
See application file for complete search history.

(56) References Cited

U.S. PATENT DOCUMENTS

| | | | | |
|---|---|---|---|---|
| 4,205,375 A | * | 5/1980 | Inouye et al. ............... | 378/4 |
| 6,018,600 A | | 1/2000 | Levin et al. ................ | 382/284 |
| 6,332,035 B1 | | 12/2001 | Basu et al. ................ | 382/128 |
| 6,741,730 B2 | * | 5/2004 | Rahn et al. ................ | 382/131 |
| 6,831,997 B2 | * | 12/2004 | Kamon ........................ | 382/144 |
| 7,039,227 B2 | * | 5/2006 | Tanaka et al. ............... | 382/131 |
| 2003/0108229 A1 | * | 6/2003 | Tanaka et al. ............... | 382/131 |
| 2003/0118223 A1 | * | 6/2003 | Rahn et al. ................ | 382/131 |
| 2006/0132783 A1 | * | 6/2006 | Ozcan et al. ................ | 356/432 |

OTHER PUBLICATIONS

F. Kreuder, et al., "Fast Calculation of the X-Ray Transform From the Radial Derivative of the 3D Radon Transform using Gridding and Fast Backprojection Techniques," *Proc. European Medical and Biological Engineering Conf. (EMBEC)*, Vienna, Nov. 4-7, 1999, vol. 37, pp. 1042-1043.

* cited by examiner

*Primary Examiner*—Samir Ahmed
*Assistant Examiner*—Anand Bhatnagar
(74) *Attorney, Agent, or Firm*—Blakely, Sokoloff, Taylor & Zafman LLP

(57) ABSTRACT

A method and system are presented for fast generation of one or more 2D DRRs of an object. 3D scan data of the object (such as CT scan data) are generated. A 3D fast Fourier transform $F(u,v,w)$ is computed for a 3D scan volume $f(x,y,z)$ within the 3D scan data, the scan volume $f(x,y,z)$ having an orientation $(\theta, \phi, \varphi)$. The 3D Fourier transform data are resampled along a surface $S(\theta, \phi, \varphi, u', v')$ at angles $\theta, \phi, \varphi$ corresponding to the orientation of the scan volume. The surface S is a plane for parallel beam geometry. For cone-beam geometry, it is the surface of a sphere whose center is coincident with the imaginary origin of the X-rays for the projection. The 2D inverse Fourier transform $F^{-1}[S(\theta, \phi, \varphi, u', v')]$ of the surface is computed, thereby generating a 2D DRR reconstructed along a projection direction perpendicular to the sample surface.

29 Claims, 7 Drawing Sheets

3D Fourier Slice Theorem

2D FOURIER SLICE THEOREM

FIG. 5A  FIG. 5B

Table 1 Comparison of computational complexity of new method with existing methods

| CT Volume (M=N=P) | Computational Complexity (Number of computations) ||||| Computation advantage for new method (# of times faster) ||
|---|---|---|---|---|---|---|---|
| | Current Methods || | New Method || | |
| | For each DRR | For 100 DRRs | 3-D FFT | For each DRR | For 100 DRRs | For each DRR | For 100 DRRs |
| 32 | 262144 | 26214400 | 491520 | 18432 | 2334720 | 26.67 | 11.23 |
| 64 | 2097152 | 209715200 | 4718592 | 81920 | 12910592 | 57.60 | 16.24 |
| 128 | 16777216 | 1677721600 | 44040192 | 360448 | 80084992 | 122.18 | 20.95 |
| 256 | 134217728 | 13421772800 | 402653184 | 1572864 | 559939584 | 256.00 | 23.97 |
| 512 | 1073741824 | 1.07374E+11 | 3623878656 | 6815744 | 4305453056 | 531.69 | 24.94 |

FIG. 7

GENERATION OF RECONSTRUCTED IMAGES

CROSS-REFERENCE TO RELATED APPLICATIONS

This application claims the benefit of priority under 35 U.S.C. §119(e) from, commonly owned U.S. provisional patent application, Ser. No. 60/504,106, filed on Sep. 18, 2003, and entitled "FAST GENERATION OF DIGITALLY RECONSTRUCTED RADIOGRAPHS USING 3-D FAST FOURIER TRANSFORMS." The entire content of this provisional application is incorporated herein by reference.

BACKGROUND

The need for computing DRRs (digitally reconstructed radiographs) arises in a number of situations. In image-guided surgery and radio-surgery, for example, DRRs from CT (computed tomography) scans of a patient are correlated with live patient images in order to determine the patient displacement from the desired position for administering the surgical treatment. Typically, the generation of a DRR for each CT orientation involves a large number of computations.

Speed is of essence when the DRRs are computed in real time, for example in order to determine the patient position, and in order to dynamically correct for patient displacement during the course of the surgical or radiosurgical treatment. Even when a library of DRRs is generated offline in order to choose a best match for the live images from the DRRs, fast DRR generation will allow for higher accuracy by generating an adequate number of DRRs to achieve the desired accuracy for determining the patient position.

Several algorithms for achieving fast DRR generation have been proposed. For example, in one known method an intermediate representation of the attenuations through the 3D CT volume, called a transgraph, is used to speed up the computation of DRRs. In the transgraph method, only a limited number of the transgraphs are computed upfront, however, so that the resulting DRRs are approximations for most positions of interest. Further, the range of orientations for which the DRRs can be computed is severely limited.

There is a need for a method and system for rapidly generating DRRs (or other forms of reconstructed 2D images) from 3D scan data.

SUMMARY

A method is presented for generating a DRR of a 3D scan volume $f(x,y,z)$ of an object, from 3D scan data representative of the 3D scan volume, for a desired orientation $(\theta, \phi, \phi)$ of the 3D scan volume $f(x,y,z)$. The method includes computing in frequency space the 3D Fourier transform $F(u,v,w)$ of the 3D scan volume $f(x,y,z)$. The values of $F(u,v,w)$ are sampled along a surface $S(\theta, \phi, \phi, u', v')$ within the 3D data set representative of the Fourier transform $F(u,v,w)$. For parallel beam geometry, the surface $S(\theta, \phi, \phi, u', v')$ is a plane. The 2D inverse Fourier transform $F^{-1}[S(\theta, \phi, \phi, u', v')]$ of the sampled surface $S(\theta, \phi, \phi, u', v')$ is computed, to obtain a DRR along a projection direction perpendicular to the surface $S(\theta, \phi, \phi, u', v')$.

The method includes a procedure for handling the cone-beam projections required for most realistic imaging applications. In one embodiment, cone-beam projections are handled by choosing the sampling surface $S(\theta, \phi, \phi, u', v')$ so that the sampled surface is part of the surface of a sphere, where the center of the sphere coincides with the origin of the projection x-rays. The 2D inverse Fourier transform $F^{-1}[S(\theta, \phi, \phi, u', v')]$ of the sampled surface $S(\theta, \phi, \phi, u', v')$ is computed, thereby obtaining a DRR along a projection that originates at the center the sphere, and projects on to a 2-D surface.

A system is presented for generating a DRR of a 3D scan volume $f(x,y,z)$ of an object, for any desired orientation $(\theta, \phi, \phi)$ of the 3D scan volume, from 3D scan data representative of the volume $f(x,y,z)$. The system includes a controller having an input module for receiving the 3D scan data. The controller includes a first processor configured to compute a 3D data set in frequency space representative of the Fourier transform $F(u,v,w)$ of the 3D scan volume $f(x,y,z)$. The controller further includes resampling software for resampling the 3D data set along a surface $S(\theta, \phi, \phi, u', v')$. The surface $S(\theta, \phi, \phi, u', v')$ passes through the origin of the 3D $F(u,v,w)$ data set, and is defined at angles $(\theta, \phi, \phi)$ corresponding to the desired orientation $(\theta, \phi, \phi)$ of the 3D scan volume. The controller includes a second processor configured to compute a 2D inverse Fourier transform $F^{-1}[S(\theta, \phi, \phi, u', v')]$ of the surface $S(\theta, \phi, \phi, u', v')$. The 2D inverse transform is a DRR along a projection direction perpendicular to the surface.

BRIEF DESCRIPTION OF THE DRAWINGS

FIGS. 5A-5C illustrate the padding of the 2D sample surface with zeros.

FIG. 7 provides a table that compares the number of computations required by methods known in the art, with the number of computations required by DRR generation using 3D fast Fourier transform.

DETAILED DESCRIPTION

A method and system is presented for fast generation of DRRs from a 3D scan volume, for any desired orientation $(\theta, \phi, \phi)$ of the 3D scan volume. A 3D fast Fourier transform of the 3D scan volume is computed. The 3D Fourier transform data are sampled along a surface perpendicular to the desired direction of projection of the DRR. The inverse Fourier transform of the sampled surface is computed, to generate a DRR for the desired orientation $(\theta, \phi, \phi)$ of the 3D scan.

Figure 1:
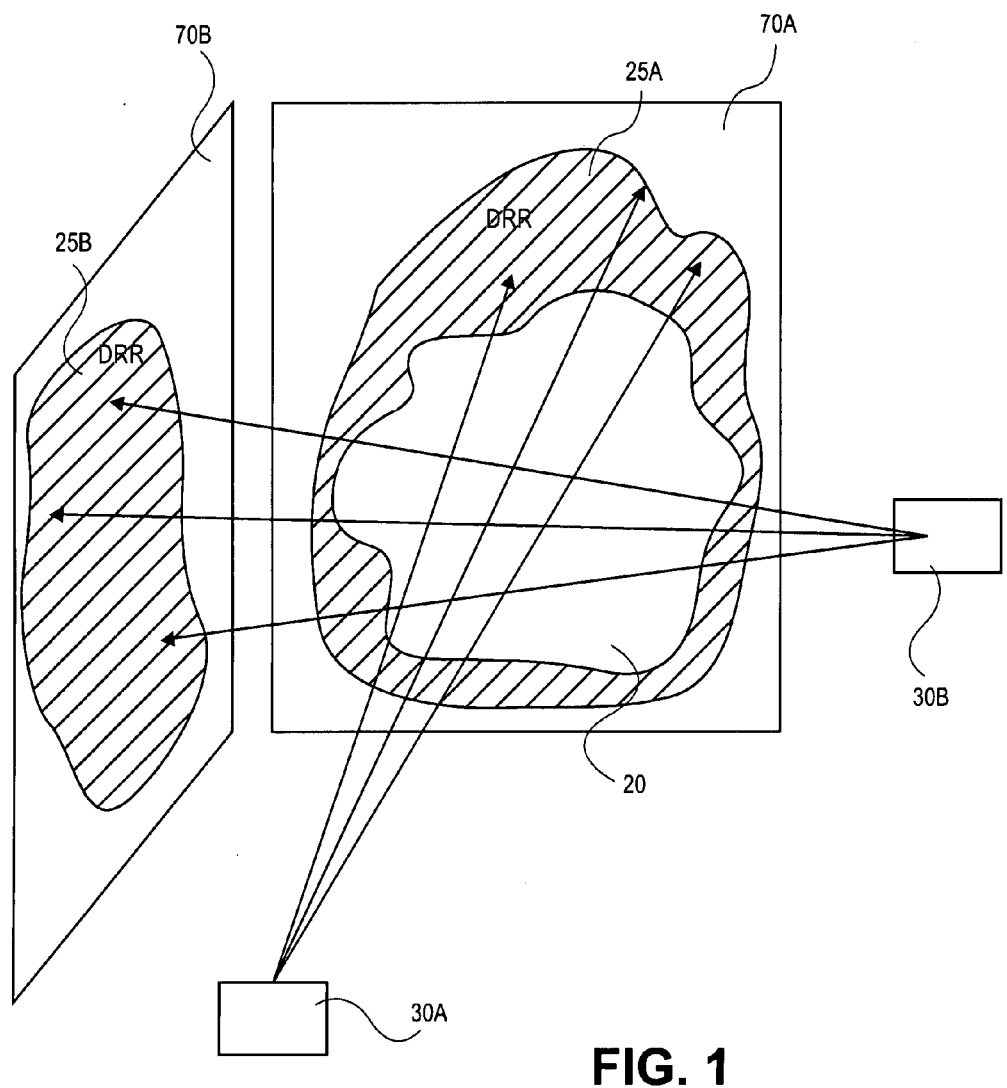
FIG. 1 schematically illustrates the generation of 2D reconstructed images of an object from 3D scan data of the object, as known in the art.

FIG. 1 schematically illustrates the generation of 2D reconstructed images of an object from 3D scan data of the object, as known in the art. In the particular illustrated embodiment, the 2D reconstructed images are DRRs (digitally reconstructed radiographs), and the 3D scan data are CT scan data. In other embodiments of the invention, however, other types of 3D scan data may be used, including but not limited to, MRI (magnetic resonance imaging) scan data, PET (positron emission tomography) scan data, and ultrasound scan data), and reconstructed images other than DRRs may be generated.

In FIG. 1, the volumetric 3D CT image of the object is referred to with the aid of reference numeral 20. The DRRs 25A and 25B, shown in FIG. 1, are artificial, synthesized 2D images that represent the radiographic image of the object that would be obtained, if imaging beams having a hypothetical intensity, position and angle were used, and if the object were positioned and oriented in accordance with the 3D CT scan data. In other words, the DRRs are calculated from 3D CT data, in an exact emulation of hypothetical or known camera perspectives. The reference numerals 30A and 30B illustrate the hypothetical positions and angles from which the imaging beams would be directed, through an object positioned in accordance with the CT volumetric image 20 of the object.

It is known to generate DRRs by casting hypothetical beams or rays through the CT volumetric image 20 of the target. Each hypothetical ray passes through a number of voxels of the 3D CT image 20. By integrating the CT numbers for these voxels along each ray, and projecting onto an imaging plane (shown as 70A and 70B, respectively, in FIG. 1), the resultant image would emulate the radiograph that would be obtained by passing rays from hypothetical camera locations and angles (shown schematically as 30A and 30B, respectively) through an object positioned in accordance with the volumetric 3D image 20. Ray tracing algorithms, known in the art, are generally used to generate the DRRs.

The method and system described in this patent make use of the well known Fourier slice theorem, in order to reduce the number of computations required to generate a DRR for a desired orientation of the CT image 20, and thereby increase the speed of DRR generation. The Fourier slice theorem states that the Fourier transform of a parallel projection of an object is equal to a slice out of the Fourier transform of the object itself. Considering a particular function f(x, y), which represents e.g. a 2D image of an object in a 2-dimensional x-y Cartesian coordinate system, the one-dimensional Fourier transform of the parallel projection of f(x,y), at some angle θ, has the same value as a line (or "slice") of the 2D Fourier transform of f(x,y) itself at that same angle θ, according to the Fourier slice theorem.

It is known in the art to use the Fourier slice theorem to estimate the image function f(x,y) using the projection data: by collecting the one-dimensional Fourier transforms of the projections at enough projection angles, an estimate of the two-dimensional transform can be made, which can then be simply inverted to estimate the image function f(x,y). In contrast these known methods, in this patent the Fourier slice theorem is extended to three dimensions. The 3D Fourier slice theorem is then used to more rapidly generate 2D projection images from the available 3D scan data, as described below.

Figure 2:
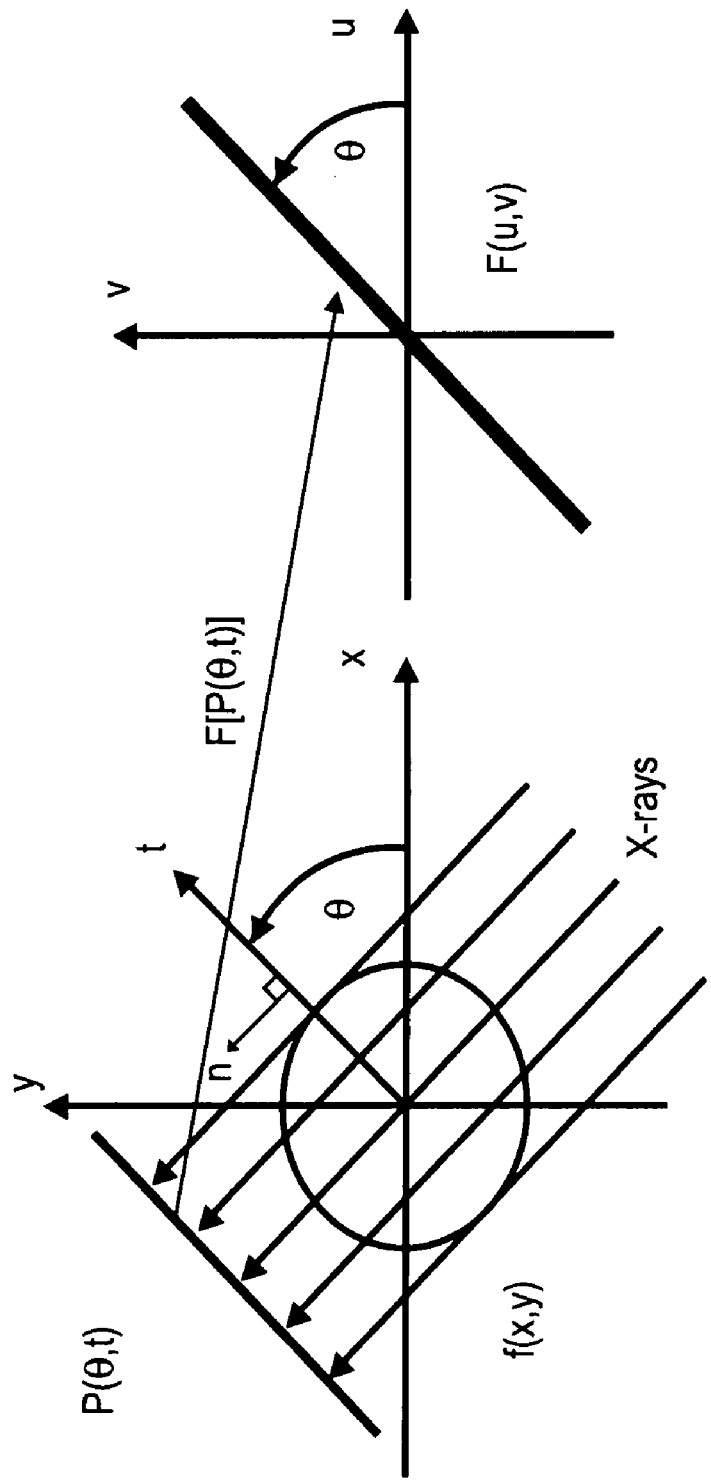
FIG. 2 is an illustration of the 2D Fourier slice theorem.

FIG. 2 is a graphical illustration of the 2D Fourier slice theorem, known in the art. FIG. 2 shows that the 1D Fourier transform of a projection (at angle θ), is a line in the 2D Fourier transform of the 2D function f(x,y) from which the projection is computed, where the normal to this line represents the projection angle θ. The projection P(θ,t) of the function f(x,y) at an angle θ is the summation of pixels of the image f(x,y) along lines normal to an axis t, as illustrated in FIG. 2. As seen from FIG. 2, the axis t can be represented, in terms of the x-y coordinates, as follows:

$$t = x \cos \theta + y \sin \theta. \quad (1)$$

An axis n (shown in FIG. 2), perpendicular to the axis t, and passing through the origin, can be defined in the terms of x-y coordinates, as follows:

$$n = -x \sin \theta + y \cos \theta. \quad (2)$$

Since the projection P(θ,t) is a summation of pixels of f(x,y) along lines that make an angle θ+90 degrees with the x-axis, it may be written in terms of an integral over the n-axis:

$$P(\theta, t) = \int f(x,y) dn. \quad (3)$$

From equations (1) and (2), it can readily be seen that $$x = t \cos \theta - n \sin \theta \quad (4)$$

$$y = t \sin \theta + n \cos \theta. \quad (5)$$

Substituting (4) and (5) into (3), the projection P(θ,t) is given by:

$$P(\theta,t) = \int_{-\infty}^{+\infty} f(x,y) dn = \int_{-\infty}^{+\infty} f(t \cos \theta - n \sin \theta, t \sin \theta + n \cos \theta) dn. \quad (6)$$

As well known, the Fourier transform of a function represents a function as a summation (or integral) of a series of sine and cosine terms of increasing frequency, and describes the amount of each frequency term that must be added together to form the function. The mathematical expression for a 1D Fourier transform $F_u$ of f(t) is given by:

$$F_u[f(t)] = \int_{-\infty}^{+\infty} f(t) e^{-2\pi j u t} dt, \quad (7)$$

and the mathematical expression for a 2D Fourier transform $F_{(u,v)}$ of f(x,y) is given by:

$$F_{(u,v)}[f(x,y)] = \int_{-\infty}^{+\infty} \int_{-\infty}^{+\infty} f(x,y) e^{-2\pi j(ux+vy)} dx\, dy. \quad (8)$$

Using equation (7), one can take a one-dimensional Fourier transform of both sides of equation (6) above:

$$F_u[P(\theta,t)] = \int_{-\infty}^{+\infty} [\int_{-\infty}^{+\infty} f(t \cos \theta - n \sin \theta, t \sin \theta + n \cos \theta) dn] e^{-2\pi j u t} dt.$$

Using equations (1), (4) and (5), the above expression becomes:

$$F_u[P(\theta,t)] = \int_{-\infty}^{+\infty} \int_{-\infty}^{+\infty} f(x,y) e^{-2\pi j u(x \cos \theta + y \sin \theta)} dn\, dt.$$

Since $\int_{-\infty}^{+\infty} \int_{-\infty}^{+\infty} dn\, dt = \int_{-\infty}^{+\infty} \int_{-\infty}^{+\infty} dx\, dy$, it follows that:

$$F_u[P(\theta,t)] = \int_{-\infty}^{+\infty} \int_{-\infty}^{+\infty} f(x,y) e^{-2\pi j[(u \cos \theta)x + (u \sin \theta)y]} dx\, dy.$$

Using equation (8), we finally obtain:

$$F_u[P(\theta,t)] = F_{(u \cos \theta, u \sin \theta)}[f(x,y)] \quad (9)$$

Equation (9) is a mathematical expression of the two-dimensional Fourier slice theorem. The left hand side of Eq. (9) is the one dimensional Fourier transform of a projection of f(x,y) along lines that make an angle of θ+90° with the x-axis. The right hand side is the two dimensional Fourier transform of f(x,y) along a radial line in frequency space, the radial line making an angle θ and passing through the origin in frequency space. FIG. 2 graphically illustrates Eq. (9), showing that the 1D Fourier transform of a projection vector P(θ,t) of f(x,y), along an axis t that makes an angle θ with respect to the x-axis in spatial dimensions, is a radial line in the 2D Fourier transform F(u,v) of the image function, the radial passing through the origin in frequency space, and making an angle θ with the horizontal axis.

It follows from the 2D Fourier slice theorem that the projection of f(x,y) along lines normal to an axis t can be generated by simply taking the inverse Fourier transform of the radial line (or "slice") of the 2D Fourier transform of the original data set f(x,y). The resulting complexity of the computations required to generate such a projection is only of the order of O(N log N), assuming that f(x,y) is represented by an array of data points having dimensions N×N), instead of $O(N^2)$.

In one embodiment, the above-described property of the Fourier slice theorem is used in order to reduce the number of computations required for generating 2D DRRs from 3D scans, by using an extension of the 2D Fourier slice theorem into three dimensions, i.e. the 3D Fourier slice theorem. Considering a 2D parallel projection of a 3D object, where the normal to the 2D projection is parallel to the projection direction, the 3D Fourier slice theorem states that the 2D Fourier transform of the 2D projection corresponds to a planar slice through the 3D Fourier transform of the object, the planar slice passing through the origin and having a normal parallel to the projection direction.

Figure 3:
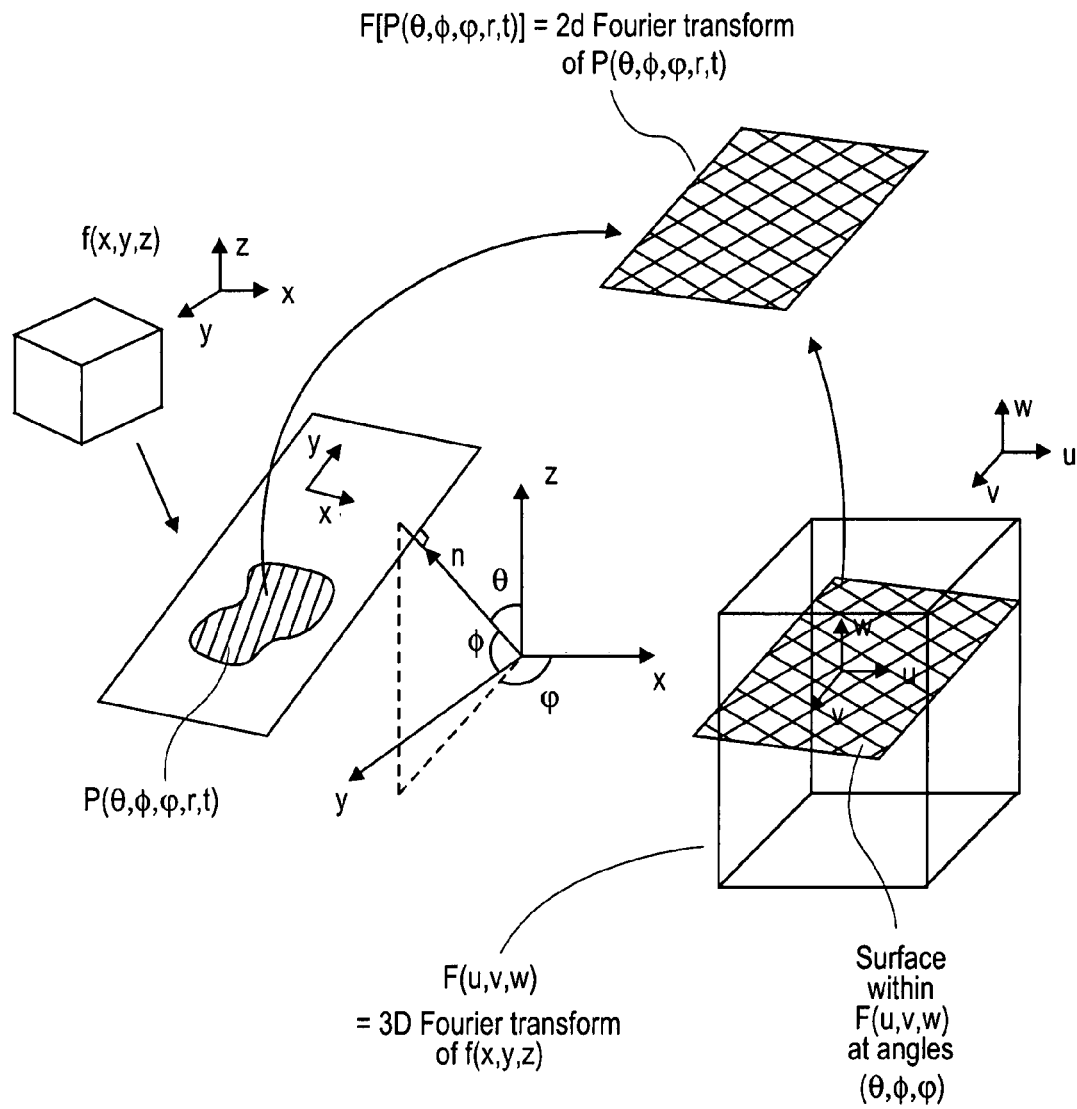
FIG. 3 schematically illustrates the extension into three dimensions of the 2D Fourier slice theorem.

FIG. 3 schematically illustrates the extension into three dimensions of the 2D Fourier slice theorem. Referring to FIG. 3, the 2D projection of the 3D image volume f(x,y,z) onto a surface defined by angles (θ, φ, φ) is a 2D summation of pixels in the 3D image volume f(x,y,z), along lines perpendicular to the surface at angles (θ, φ, φ), by analogy to the two dimensional case. The representation in FIG. 3 of the surface of projection is given using a normal vector n perpendicular to the projection surface. For consistency in comparing with FIG. 2, F(u,v,w) denotes the 3D Fourier transform of the 3D image volume f(x,y,z), and F[P(θ, φ, φ, r, t)] denotes the 2D Fourier Transform of the 2D projection P(θ, φ, φ, r, t). Then the 3D Fourier slice theorem can be stated as follows: "the 2D Fourier Transform F[P(θ, φ, φ, r, t)] of the projection image P(θ(φ, φ, r, t) along the axes (r,t), is a surface at angles (θ, φ, φ) in the 3D Fourier transform F(u,v,w) of the image f(x,y,z)." The 2D surface passes through the origin of the 3D Fourier transform, and has the same orientation (θ, φ, φ).

Using the 3D Fourier slice theorem, projections of a 3D CT scan volume f(x,y,z) at arbitrary angles can be computed quickly, by first computing the 3D forward Fourier transform of the 3D function f(x,y,z) as a preprocessing operation, then taking 2D slices out of that 3D transform, and performing inverse 2D transforms of the 2D slices. Computation time is reduced, once the initial one-time step of computing the Fourier transform has been taken care of, because the computation intensive 3D Fourier transform needs only be computed once, in the beginning. Once this step is completed, only 2D manifolds of data need to be handled, thereafter, thereby considerably increasing the efficiency of generating DRRs.

Figure 4:
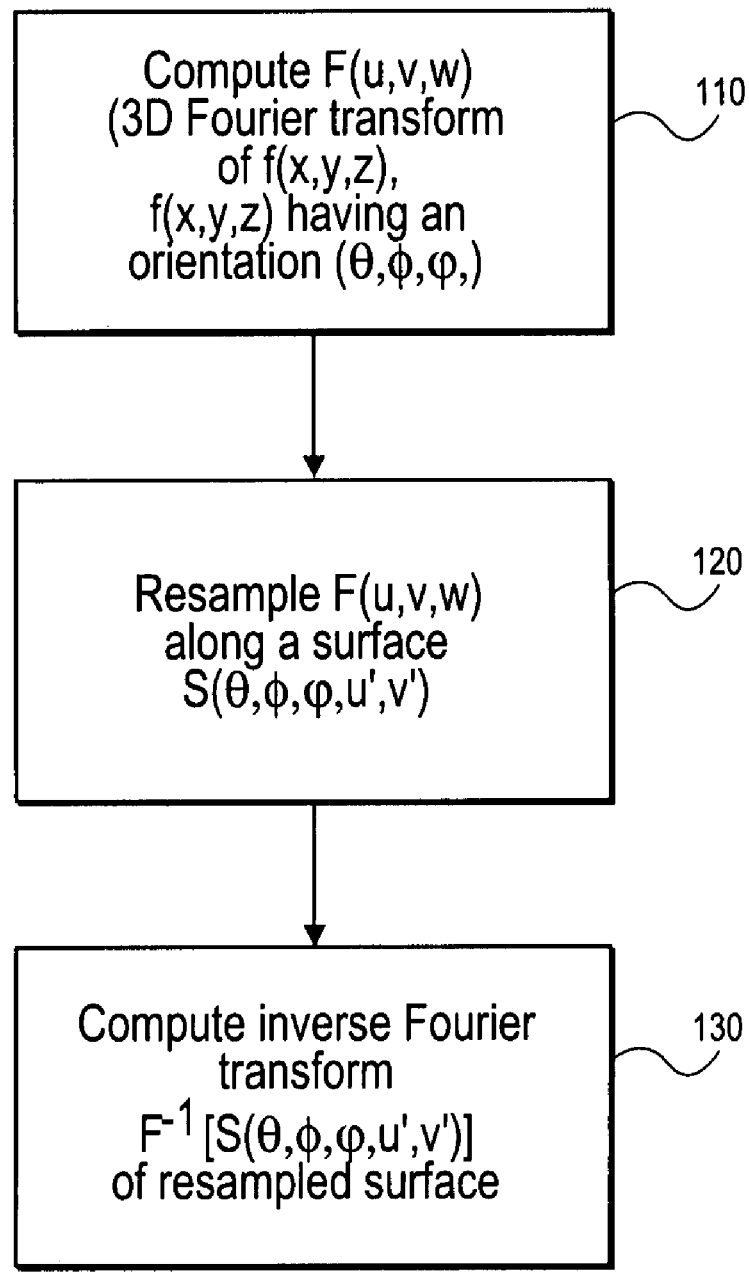
FIG. 4 is a schematic flow chart of a method for fast generation of 2D DRRs using 3D fast Fourier transform.

FIG. 4 is a schematic flow chart 100 of a method for fast generation of 2D DRRs, in accordance with one embodiment. Generation of fast DRRs using this method consists of finding the appropriate surface within the 3D Fourier transform that matches the 2D Fourier transform of the observed 2D DRR image representing the projection of the 3D object from some orientation. By choosing surfaces at any desired orientation, and computing the inverse Fourier transform of that surface, DRRs for any desired orientation of the CT scan volume can be rapidly computed.

In overview, the method for fast generation of DRRs consists of steps 110, 120, and 130, as schematically illustrated in FIG. 4. In step 110, the 3D Fourier transform F(u,v,w) of the function f(x,y,z) is computed, where f(x,y,z) represents the 3D scan volume. This is the initial preprocessing 3D transformation step. After this step, two operations are performed in order to generate a 2D DRR at some desired projection angle. First, in step 120, a surface S (which is a surface for parallel beam geometry, and which is part of a spherical surface for cone beam geometry) is extracted out of the 3D data set representing F(u,v,w) that is perpendicular to the direction of projection of the DRR, i.e. an appropriate matching surface is chosen from the 3D F(u,v,w) data set. This step involves resampling in the frequency domain. The 3D array of F(u,v,w) data is resampled along a surface. Next, in step 130, the 2D inverse Fourier transform of the extracted surface is calculated. This 2D inverse Fourier transform is a DRR along a projection direction perpendicular to the extracted surface.

Once step 110 of computing the transform F(u,v,w) has been performed in the beginning, steps 120 (resampling along a surface) and 130 (taking the inverse 2D Fourier transform of the resampled surface) can be performed for any desired direction of projection, i.e. for any desired orientation of the 3D scan volume. DRRs for different viewing angles can be obtained simply by repeating steps 2) and 3). In this way, DRRs can be rapidly generated, at any desired projection direction, i.e. for any desired orientation of the 3D scan volume. Subsequent to step 1), the required complexity of computations is of the order of $O(N^2 \log N)$, which is the complexity of the inverse Fourier transform operation, where the dimensions of the 3D data set for F(u,v,w) is given by N*N*N.

The resampling step 120 is a process that involves the extraction and interpolation of grey levels from pixel locations in the original 3D data set. Resampling involves: 1) positioning the origin of the resampling kernel at the data point to be resampled; 2) multiplying neighboring pixel values with the resampling kernel value at those data points; and 3) adding together the multiplied values, to form the resampled value. To optimize the resampling process, an appropriate 3D resampling kernel should be selected for sampling the values across the surface S(θ, φ, φ, u', v'). A number of resampling methods may be used, including but not limited to: nearest neighbor resampling method; bi-linear interpolation; tri-linear interpolation; sinc function (sin(x)/x) resampling kernel method. Other resampling methods known in the art can also be used, including but not limited to: resampling using other types of resampling kernels such as the Gaussian resampling kernel or the spline resampling kernel; and cubic convolution.

The resampling method that is most efficient, in terms of computation time, is the nearest neighbor resampling method. Nearest neighbor interpolation determines the grey level from the closest pixel to the specified input data coordinates, and assigns that value to the output data coordinates. In other words, nearest neighbor resampling copies the value from the nearest reference pixel to that location.

For better accuracy, bi-linear, tri-linear, or bi-sinc kernels can be used. Bi-linear interpolation determines the grey level from the weighted average of the four closest pixels to the specified input data coordinates, and assigns that value to the output data coordinates. Tri-linear interpolation is an improvement on linear interpolation, and ramps between several different linear interpolations. Two pixels that are closest to the input coordinates are picked, and two weights are computed that are applied to the pixel values for each of the two pixels. For each of those two pixel values, the four closest pixels at each value are found, and bi-linear interpolation is performed between these four pixels to find the pixel value at that position. The two pixel values are then combined using appropriate weights, to generate the final interpolated value.

A number of additional optimizations can be performed, when sampling the surface S (θ, φ, φ, u', v') from the 3D fast Fourier transform volume. These optimizations include: 1) selecting only a sub-volume around the origin to resample;

2) padding the 2D sample surface with zeros; and 3) applying a convolution filter, by multiplying the Fourier sample surface with a 2D Fourier transform of the convolution filter. Since a 3D fast Fourier transform concentrates most of the information close to the origin, efficiency can be achieved by selecting only a sub-volume around the origin to resample.

Figure 5C:
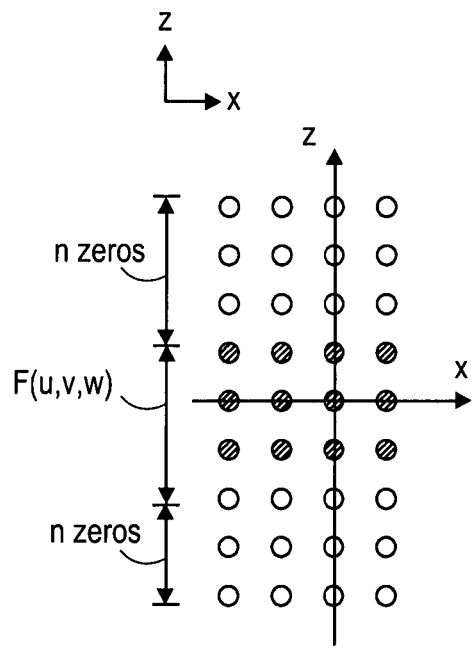
Figure 5C:
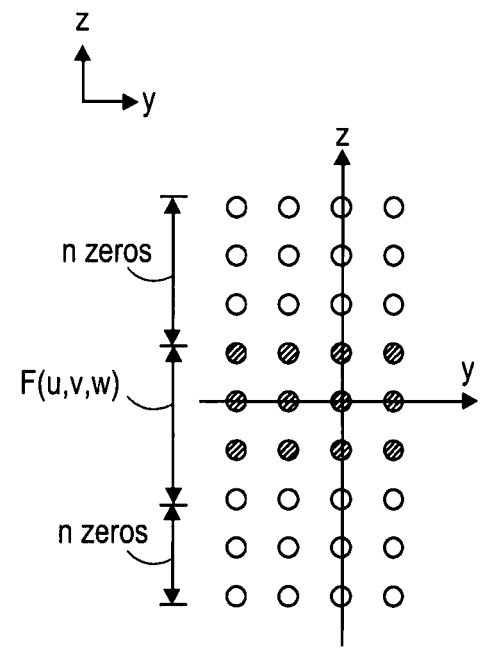
Figure 5C:
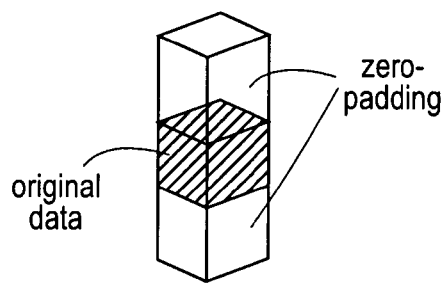

Resampling in the frequency domain can introduce aliasing artifacts. To prevent aliasing, the 3D F(u,v,w) data set must be sampled at a high enough rate. Zero-padding may be require in order to generate a DRR of appropriate pixel spacing. FIGS. 5A, 5B and 5C schematically illustrate the padding of the 2D sample surface with zeros. FIGS. 5A and 5B illustrate the 2D projections of F(u,v,w), in the z-x surface and the z-y surface, respectively. In both figures, a padding of size n are used on the top and bottom of the F(u,v,w) volume, along the z-axis. FIG. 5C provides a 3D illustration of zero-padding.

For parallel beam geometry, the surface $S(\theta, \phi, \phi, u', v')$ is a plane. For cone-beam geometry, the surface $S(\theta, \phi, \phi, u', v')$ is part of a sphere whose center is coincident with the imaginary origin of the x-rays for projection. In one embodiment, the resampling step 120 includes a procedure for handling cone-beam projections, which are required for most realistic imaging applications. Cone-beam projections refer to the projection geometry closely approximated by real world imaging systems, in which the x-rays (or other type of imaging beams) originate from a single point source, pass through the object of interest, and are incident upon a 2D flat surface such as a 2D x-ray detector array. In order to handle cone-beam projections, the sampling surface $S(\theta, \phi, \phi, u', v')$ is chosen in such a way that the surface is part of the surface of a sphere, where the center of the sphere coincides with the point of origination of the x-rays or other imaging beam. The 2D inverse Fourier transform $F^{-1}[S(\theta, \phi, \phi, u', v')]$ of the sampled surface $S(\theta, \phi, \phi, u', v')$ is then computed. In this way, a DRR is obtained along the direction of a projection that originates at the center the sphere, and projects on to a 2-D surface.

Figure 6:
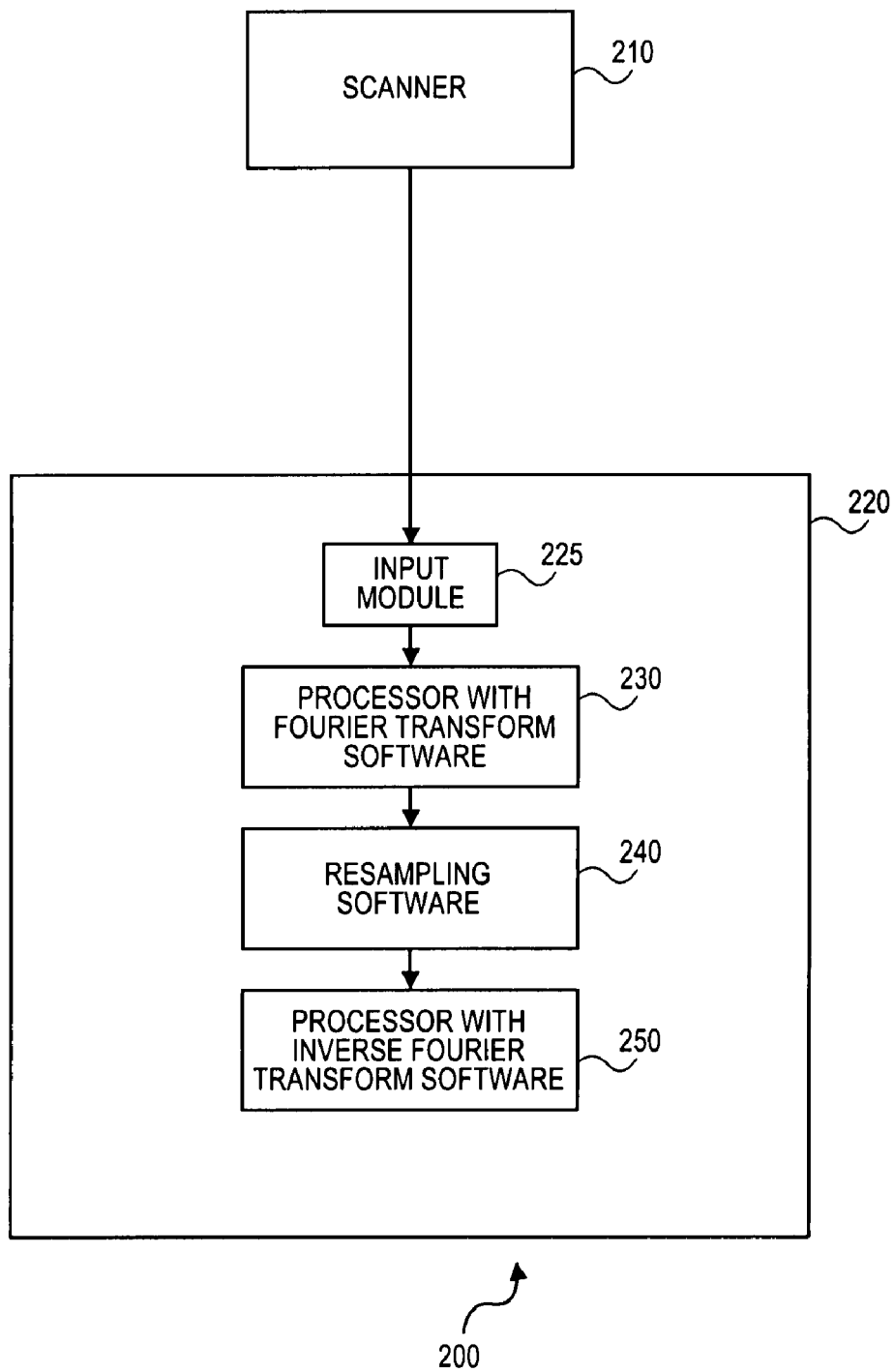
FIG. 6 is a schematic block diagram of a system for fast generation of 2D reconstructed images.

FIG. 6 is a schematic block diagram of a system 200 for fast generation of 2D reconstructed images of an object using 3D fast Fourier transforms. In the illustrated embodiment, the system 200 includes a 3D scanner 210 (including but not limited to a CT scanner, a PET scanner, an MRI scanner, and an ultrasound scanner) that generates 3D scan data representative of an object. In particular, the 3D scan data includes scan data representative of a 3D scan volume (represented as f(x,y,z) in an x-y-z Cartesian coordinate system) of the object, the 3D scan volume having a certain 3D orientation defined by angles $(\theta, \phi, \phi)$. In other embodiments, however, the system 200 does not include a 3D scanner, and simply receives 3D scan data representative of f(x,y,z) that have been generated elsewhere.

The system 200 includes a controller 220. The controller 220 includes an input module 225, or other means for receiving the 3D scan data of f(x,y,z), which may be provided by the scanner 210, or which may have been generated elsewhere. The controller 220 includes a first processor 230 that includes 3D Fourier transform software and that is configured to compute a 3D data set representative of a Fourier transform F(u,v,w) of the 3D scan volume f(x,y,z). The variables u, v, w respectively represent variables along three mutually orthogonal coordinate axes in the frequency domain. Computation of 3D Fourier transforms is well known, and standard software and/or algorithms that are commercially available may be used.

The controller 220 includes resampling software 240 for resampling the 3D F(u,v,w) data set along a surface $S(\theta, \phi, \phi, u', v')$ that passes through the origin of the 3D F(u,v,w) data set, and that is defined at angles $(\theta, \phi, \phi)$ corresponding to the orientation of the 3D scan volume f(x,y,z). In one embodiment, the resampling software 240 includes software for performing nearest-neighbor resampling. In this embodiment, the resampling software assigns, to each pixel along the surface $S(\theta, \phi, \phi, u', v')$ in the 3D F(u,v,w) data set, the value of the closest neighboring pixel. In other embodiments, the resampling software 240 includes software for performing resampling methods that involve an appropriate resampling kernel. In these embodiments, the resampling software multiplies one or more neighboring pixel values with the resampling kernel value at a sample data point, for each data point along the surface each data point along the surface $S(\theta, \phi, \phi, u', v')$. The resampling software then adds together the multiplied values to form the resampled pixel value. Possible resampling kernels that can be used include, but are not limited to: a bi-linear resampling kernel; a tri-linear resampling kernel; a sinc resampling kernel; and a bi-sinc resampling kernel. Resampling 3D data sets is also well known in the art, and standard commercially available software and/or algorithms may be used.

In a particular embodiment, the resampling software 240 includes software for padding the sample surface $S(\theta, \phi, \phi, u', v')$ with zeros, to reduce aliasing artifacts. In another embodiment, the resampling software 240 includes software for computing a 2D Fourier transform of a convolution filter, and for multiplying the surface $S(\theta, \phi, \phi, u', v')$ with the 2D Fourier transform of the convolution filter.

The controller 220 includes a second processor 250 that includes inverse Fourier transform software, and that is configured to compute the 2D inverse fast Fourier transform $F^{-1}[S(\theta, \phi, \phi, u', v')]$ of the resampled surface $S(\theta, \phi, \phi, u', v')$. The inverse transform $F^{-1}[S(\theta, \phi, \phi, u', v')]$ is a DRR along a projection direction perpendicular to the surface $S(\theta, \phi, \phi, u', v')$. Computation of inverse Fourier transforms is also well known, and standard software and/or algorithms that are commercially available may be used.

The DRR generation technique described above is about an order of magnitude faster than existing methods of DRR generation of equivalent accuracy for offline DRR generation. After accounting for an initial cost for computing the 3D Fourier transform, the technique is faster than existing methods by about two orders of magnitude, for real-time DRR generation. The DRR generation technique described has a computational complexity proportional to M×N, compared to the complexity of traditional methods of M×N×P, where M and N respectively represent the number of rows and columns of the DRRs, and P represents the number of layers in the CT volume.

FIG. 7 provides a table ("Table 1") that compares the number of computations required by existing known methods, with the number of computations required by a DRR generation technique using 3D fast Fourier transform, and the 3D Fourier slice theorem, as described above. Typically, current known methods for generating a DRR having a size of M×N from a CT scan data volume of M×N×P, using a resampling kernel of size k, requires M*N*P*k computations.

In contrast, the computational complexity of the DRR generation technique described above is considerably reduced, for the following reasons. To resample a plane of size M×N from the 3D fast Fourier transform volume requires M*N*k computations. To compute the DRRs from this plane using inverse fast Fourier transforms requires M\*N\*(log$_2$ M+log$_2$ N) computations. Therefore, the total number of computations, per DRR, is M\*N\*(k+log$_2$ M+log$_2$ N). The additional one-time overhead of computing the 3D fast Fourier transform of the CT volume involves M\*N\*P (log$_2$ M+log$_2$ N+log$_2$ p) computations.

Table 1 in FIG. 7 gives a comparison of the computational complexity for CT volume sizes of 32 to 512 pixels in all three dimensions. The dimensions of the DRR are assumed to be same as the dimensions of the CT, for convenience and simplicity of illustration, although of course this restriction is not necessary for implementing the method and system described above, and other embodiments may include DRRs and CT scans having arbitrary dimensions. For each method, two numbers are computed: the first column in Table 1 gives the number of computations for each DRR. When computing this number, the overhead involved in computing the 3D fast Fourier transform has been ignored. Therefore, this column is useful for comparing the computational complexity involved in real-time DRR generation. The second column in Table 1, under each listed algorithm, gives the number of computations for computing 100 DRRs. The number in the second column includes the overhead involved in initially computing the 3D fast Fourier transform. The second column in Table 1 is thus useful for comparing the performance of the fast DRR generation technique (describe above) for computing a library of DRRs.

From the table in FIG. 7, it can be observed that for real-time DRR generation, the DRR generation technique described above is more than 25 to 500 times faster than the existing methods. For off-line DRR generation, the technique is more than 10 to 20 times faster than the existing algorithms.

In sum, a method and system for fast DRR generation, using an extension of the 2-D Fourier slice theorem to three dimensions, has been described. This technique is one or more orders of magnitude (11 to 25 times) faster than the current methods that operate in the 3-D space domain. This technique is about two or more orders of magnitude (25 to 500 times) faster for real-time DRR generation. Further, this technique provides additional processing advantages over existing methods. For example, a smoothing filter can be achieved by zeroing the higher order frequency components in the spatial frequency domain. Also, an appropriate convolution filter can be applied efficiently in the spatial frequency domain, by multiplying the 2D sample surface in the frequency domain by the 2D fast Fourier transform of the convolution filter. Cone beam projections, required for most realistic imaging applications, can also be handled.

What is claimed is:

1. A method of generating a reconstructed 2D image of a 3D scan volume f(x,y,z) of an object, for an orientation (θ, φ, ϕ) of the 3D scan volume f(x,y,z), the method comprising:
   a. generating 3D scan data representative of the 3D scan volume f(x,y,z) of said object;
   b. computing a 3D Fourier transform F(u,v,w) of the 3D scan volume f(x,y,z), wherein u,v, and w are variables in a three-dimensional frequency domain;
   c. sampling a surface S(θ, φ, ϕ, u', v') within said 3D Fourier transform F(u,v,w), at angles (θ, φ, ϕ) corresponding to said orientation of said 3D scan volume; and
   d. computing the 2D inverse Fourier transform F$^{-1}$[S(θ, φ, ϕ, u', v')] of said surface S(θ, φ, ϕ, u', v').

2. A method in accordance with claim 1, wherein the reconstructed 2D image comprises a DRR (digitally reconstructed radiograph).

3. A method in accordance with claim 2, wherein F$^{-1}$ [S(θ, φ, ϕ, u', v')] is a 2D DRR reconstructed along a projection direction perpendicular to said surface S(θ, φ, ϕ, u', v').

4. A method in accordance with claim 3,
   wherein the projection direction comprises a direction of a cone projection, the cone projection being the projection of a beam originating from a point source, passing through the scan volume, and incident upon a planar 2D surface;
   wherein said 2D DRR represents the radiographic image of the scan volume that would be obtained with an imaging beam emitted from a point source disposed at a known position and angle, if said scan volume were positioned in accordance with said 3D scan data; and
   wherein the step of sampling said surface S(θ, φ, ϕ, u', v') within said Fourier transform F(u,v,w) comprises the step of selecting the sampling surface in a way that the sampled surface is part of the surface of a sphere whose center is coincident with said point source.

5. A method in accordance with claim 1, wherein said 3D scan data comprise at least one of: CT scan data, PET (positron emission tomography) scan data, MRI (magnetic resonance imaging) scan data, and ultrasound scan data.

6. A method in accordance with claim 1, wherein sampling in part c said surface S(θ, φ, ϕ, u', v') at angles (θ, φ, ϕ) comprises selecting a 3D resampling kernel.

7. A method in accordance with claim 6, wherein said 3D resampling kernel comprises at least one of: a bi-linear kernel, a tri-linear kernel, and a bi-sinc kernel.

8. A method in accordance with claim 1, wherein the step of sampling said surface S(θ, φ, ϕ, u', v') comprises the step of selecting a sub-volume around an origin for resampling, when sampling said surface S(θ, φ, ϕ, u', v') in part c.

9. A method in accordance with claim 1, further comprising padding said sample surface S(θ, φ, ϕ, u', v') with zeros, after sampling said surface S(θ, φ, ϕ, u', v') in part c.

10. A method in accordance with claim 1, further comprising applying a convolution filter to said sample surface S(θ, φ, ϕ, u', v'), by multiplying said sample surface with a 2D fast Fourier Transform of said convolution filter.

11. A method in accordance with claim 1, wherein said 3D scan volume is characterized by spatial dimensions given by (M\*N\*P), and wherein said reconstructed 2D image and said sampling surface are characterized by spatial dimensions given by (M\*N).

12. A method in accordance with claim 1, wherein said Fourier transform F(u,v,w) is represented mathematically by:

$$F(u, v, w) = \int_{-\infty}^{+\infty} \int_{-\infty}^{+\infty} \int_{-\infty}^{+\infty} f(x,y,z) e^{-2\pi j(ux+vy+wz)} dx\, dy\, dz.$$

13. A method of generating a 2D DRR (digitally reconstructed radiograph) of a 3D scan volume f(x,y,z) of an object from 3D scan data representative of said 3D scan volume, for an orientation (θ, φ, ϕ) of said 3D scan volume, the method comprising:
   a. generating a 3D data set in frequency space representative of the 3D Fourier transform F(u,v,w) of said 3D scan volume f(x,y,z);
   b. resampling said 3D F(u,v,w) data set along a surface S(θ, φ, ϕ, u', v') within said data set, said surface passing through the origin of said 3D data set and being defined by angles (θ, φ, ϕ) corresponding to said orientation of said 3D scan volume; and c. computing the 2D inverse Fourier transform $F^{-1}[S(\theta, \phi, \phi, u', v')]$ of said surface $S(\theta, \phi, \phi, u', v')$ to generate a DRR along a projection direction perpendicular to said surface $S(\theta, \phi, \phi, u', v')$.

14. A method in accordance with claim 13, wherein resampling along said surface $S(\theta, \phi, \phi, u', v')$ comprises assigning, to each pixel along said surface in said 3D data set representative of $F(u,v,w)$, the value of the closest neighboring pixel.

15. A method in accordance with claim 13, wherein resampling along said surface $S(\theta, \phi, \phi, u', v')$ comprises:
   a) selecting a resampling kernel;
   b) for each data point along said surface, multiplying one or more neighboring pixel values with the resampling kernel value at the sample point, and
   c) adding together the multiplied values to form the resampled pixel value.

16. A method in accordance with claim 13, wherein said resampling kernel comprises at least one of:
   a. a bi-linear resampling kernel;
   b. a tri-linear resampling kernel;
   c. a sinc resampling kernel; and
   d. a bi-sinc resampling kernel.

17. A method in accordance with claim 13, wherein resampling along said surface $S(\theta, \phi, \phi, u', v')$ comprises padding said surface with zeros.

18. A method in accordance with claim 13, wherein resampling along said surface $S(\theta, \phi, \phi, u', v')$ comprises multiplying said surface with a 2D Fourier transform of a convolution filter.

19. A system for generating a reconstructed 2D image of an object representative of a 3D scan volume $f(x,y,z)$ of the object, for an orientation $(\theta, \phi, \phi)$ of said 3D scan volume, the system comprising:
   a. a scanner configured to provide 3D scan data representative of said 3D scan volume $f(x,y,z)$;
   b. a controller, including:
      i. an input module configured to receive said 3D scan data;
      ii. a first processor configured to generate a 3D data set representative of a 3D Fourier transform $F(u,v,w)$ of said 3D scan volume $f(x,y,z)$, where u, v, and w represent variables along three mutually orthogonal coordinate axes in the frequency domain;
      iii. resampling means for resampling said 3D data set along a surface $S(\theta, \phi, \phi, u', v')$, said surface $S(\theta, \phi, \phi, u', v')$ being defined at angles $(\theta, \phi, \phi)$ corresponding to said orientation of said 3D scan volume; and
      iv. a second processor configured to compute a 2D inverse Fourier transform $F^{-1}[S(\theta, \phi, \phi, u', v')]$ of said surface $S(\theta, \phi, \phi, u', v')$.

20. A system in accordance with claim 19, wherein said scanner comprises at least one of: a CT scanner; a PET scanner; an MRI scanner; and an ultrasound scanner.

21. A system in accordance with claim 19, wherein said reconstructed 2D image comprises a DRR (digitally reconstructed radiograph).

22. A system in accordance with claim 19, wherein said 2D inverse Fourier transform $F^{-1}[S(\theta, \phi, \phi, u', v')]$ is a 2D DRR reconstructed along projection direction that is perpendicular to said surface $S(\theta, \phi, \phi, u', v')$.

23. A system in accordance with claim 22,
   wherein said projection direction comprises a direction of a cone projection, the cone projection being the projection of a beam originating from a point source and passing through said scan volume and incident upon a planar 2D surface;
   wherein said 2D DRR represents the radiographic image of said scan volume that would be obtained with an imaging beam emitted from a point source disposed at a known position and angle, if said scan volume were positioned in accordance with said 3D scan data; and
   wherein said means for sampling said surface $S(\theta, \phi, \phi, u', v')$ comprises means for selecting a sampled surface that is part of the surface of a sphere whose center is coincident with said point source.

24. A system in accordance with claim 19, wherein said means for resampling said surface $S(\theta, \phi, \phi, u', v')$ comprise means for selecting a 3D resampling kernel.

25. A system in accordance with claim 19, wherein said 3D resampling kernel comprises at least one of: a bi-linear kernel, a tri-linear kernel, and a bi-sinc kernel.

26. A system in accordance with claim 19, wherein said means for sampling said surface $S(\theta, \phi, \phi, u', v')$ comprise means for selecting a sub-volume around an origin for resampling.

27. A system in accordance with claim 19, wherein said 3D scan volume is characterized by spatial dimensions (M*N*P),
   and wherein said reconstructed 2D image and said sampling surface are characterized by spatial dimensions (M*N).

28. A system in accordance with claim 19, wherein said resampling means comprise:
   a. means for multiplying, for each data point along said surface, one or more neighboring pixel values with the value of a resampling kernel at said data point; and
   b. means for summing said multiplied values to form a resampled pixel value.

29. A system for generating a DRR of a 3D scan volume $f(x,y,z)$ of an object, for an orientation $(\theta, \phi, \phi)$ of said 3D scan volume, from 3D scan data representative of said volume $f(x,y,z)$, the system comprising:
   A. a controller, including:
      a. an input module configured to receive said 3D scan data;
      b. a first processor configured to compute a 3D data set in frequency space representative of Fourier transform $F(u,v,w)$ of said 3D scan volume $f(x,y,z)$, where u, v, and w represent variables along three mutually orthogonal coordinate axes in the frequency domain;
      c. resampling means for resampling said 3D data set along a surface $S(\theta, \phi, \phi, u', v')$, said surface $S(\theta, \phi, \phi, u', v')$ passing through the origin and being defined at angles $(\theta, \phi, \phi)$ corresponding to said orientation of said 3D scan volume; and
      d. a second processor configured to compute a 2D inverse Fourier transform $F^{-1}[S(\theta, \phi, \phi, u', v')]$ of said surface $S(\theta, \phi, \phi, u', v')$;
   wherein said 2D inverse transform $F^{-1}[S(\theta, \phi, \phi, u', v')]$ is a DRR along a projection direction perpendicular to said surface $S(\theta, \phi, \phi, u', v')$.

* * * * *